No. 891,993. PATENTED JUNE 30, 1908.
H. HESS.
FLEXIBLE PISTON CONNECTION.
APPLICATION FILED JULY 27, 1907.

Witnesses:

Inventor:
HENRY HESS
By his Attorney

UNITED STATES PATENT OFFICE.

HENRY HESS, OF WAWA, PENNSYLVANIA.

FLEXIBLE PISTON CONNECTION.

No. 891,993.

Specification of Letters Patent.

Patented June 30, 1908.

Application filed July 27, 1907. Serial No. 385,857.

*To all whom it may concern:*

Be it known that I, HENRY HESS, a citizen of the United States, residing at Wawa, in the county of Delaware and State of Pennsylvania, have invented certain new and useful Improvements in Flexible Piston Connections, of which the following is a specification, reference being had therein to the accompanying drawing.

My invention relates to flexible piston connections for use in heat, steam, internal combustion and other engines, and more particularly to that class thereof designed to insure the proper attachment of the connecting rod to the piston and at the same time to obviate various difficulties and disadvantages in existing methods, as hereinafter set forth.

Figure 1:
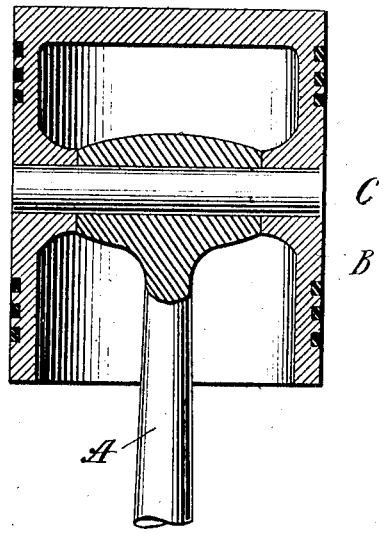
Figure 2:
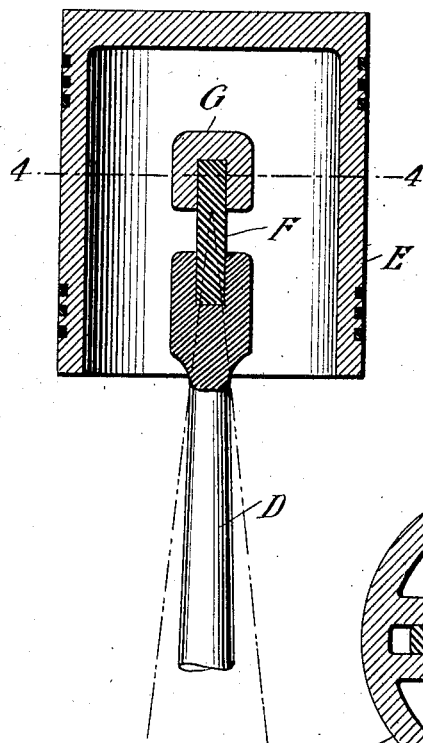
Figure 3:
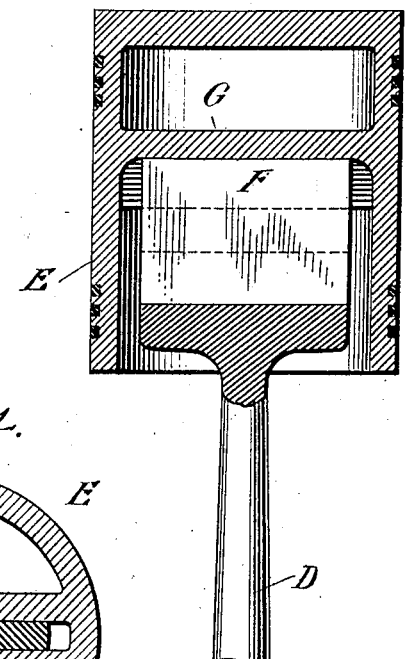

Referring to the drawing: Figure 1 is a longitudinal section of a piston, piston-rod, etc., as employed in a well known type of engine, and illustrating particularly one form of connecting devices, on which my invention is an improvement: Fig. 2 is a sectional view of the same parts with my improvement embodied therein, but taken at right angles to the section shown in Fig. 1; Fig. 3 is a sectional view of the same, the section being at right angles to that of Fig. 2: and Fig. 4 is a transverse section on the line 4—4 of Fig. 2.

In the form of mechanism shown in Fig. 1, it will be noted, that the piston-rod A is connected to the piston B by a pin C, which passes through a cylindrical opening in the end of the piston-rod, thereby permitting a certain amount of radial play about the pin, this radial motion being ordinarily necessary in connection with the longitudinal reciprocation of the rod, due to the connection of the latter at its other end to a crank, in the manner well understood. The chief problem attending this form of connection is that of lubrication. Not only are the parts difficult of access but their great heat quickly dries out the oil or other lubricator applied, and this latter condition particularly exists in internal combustion engines. Many engines also have the parts vertically arranged and the problem is thereby even further complicated. To obviate these difficulties and objections is the purpose of my invention and I accomplish the result by a form of flexible connection wherein no lubrication is necessary.

Figure 4:
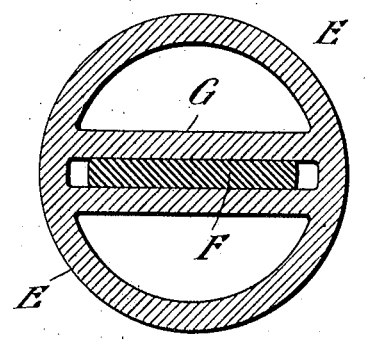

Referring to Figs. 2, 3, and 4, which illustrate my improvement, it will be observed that the piston-rod D is connected to the piston E by a flexible connection, shown by way of example as an elastic plate or blade F, which connects the end of rod D to the cross-bar G of the piston E. This blade is formed of the proper material and of the requisite dimensions to permit it to yield laterally and allow the radial motion of the piston-rod previously described and as indicated by dotted lines in Fig. 2. The bending of the blade thus permits the same function as the pivotal connection shown in Fig. 1,—namely, the oscillation of the piston-rod,—and as there is no friction between parts moving relatively to each other, lubrication is unnecessary. As shown in the drawing, the blade F is fastened in place by being firmly seated in suitable recesses in the cross-bar and in the end of rod D, but obviously other securing means may be employed for the purpose, when desired.

I am aware that it is old to employ such a flexible or elastic blade for somewhat analogous purposes in other mechanisms, such as the suspension of pendulums in clocks, or as a substitute for the ordinary knife-edge in testing machines and weighing apparatus, and the like, and I lay no claim to such employment, my invention consisting in its broadest terms in the combination of such a flexible and elastic connecting member with a piston and piston-rod.

What I claim and desire to secure by Letters Patent of the United States is as follows:

1. The combination of the piston and the piston-rod with a flexible and elastic laterally-yielding connecting member.

2. The combination of the piston and the piston-rod with a flexible and elastic laterally-yielding blade for connecting them.

In testimony whereof I have affixed my signature in presence of two witnesses.

HENRY HESS.

Witnesses:
 NETTIE L. HAHN,
 C. D. McCALLA.